United States Patent
Jiang et al.

(10) Patent No.: US 12,184,672 B2
(45) Date of Patent: Dec. 31, 2024

(54) METHOD AND DEVICE FOR DETECTING SECURITY BASED ON MACHINE LEARNING IN COMBINATION WITH RULE MATCHING

(71) Applicant: UNIVERSITY OF SCIENCE AND TECHNOLOGY OF CHINA, Anhui (CN)

(72) Inventors: Xiaofeng Jiang, Anhui (CN); Siyu Cheng, Anhui (CN); Jian Yang, Anhui (CN); Xiaobin Tan, Anhui (CN); Yongdong Zhang, Anhui (CN)

(73) Assignee: UNIVERSITY OF SCIENCE AND TECHNOLOGY OF CHINA, Anhui (CN)

( * ) Notice: Subject to any disclaimer, the term of this patent is extended or adjusted under 35 U.S.C. 154(b) by 315 days.

(21) Appl. No.: 17/761,861

(22) PCT Filed: Mar. 18, 2020

(86) PCT No.: PCT/CN2020/079972
§ 371 (c)(1),
(2) Date: Mar. 18, 2022

(87) PCT Pub. No.: WO2021/082339
PCT Pub. Date: May 6, 2021

(65) Prior Publication Data
US 2022/0368703 A1 Nov. 17, 2022

(30) Foreign Application Priority Data
Oct. 28, 2019 (CN) .......................... 201911031332.5

(51) Int. Cl.
*H04L 29/00* (2006.01)
*G06N 20/00* (2019.01)
*H04L 9/40* (2022.01)

(52) U.S. Cl.
CPC ......... *H04L 63/1416* (2013.01); *G06N 20/00* (2019.01)

(58) Field of Classification Search
CPC ........................... H04L 63/1416; G06N 20/00
(Continued)

(56) References Cited

U.S. PATENT DOCUMENTS

| 2016/0294859 A1 | 10/2016 | Choi et al. | |
| 2018/0234302 A1* | 8/2018 | James | G06N 20/00 |
| 2019/0297096 A1* | 9/2019 | Ahmed | H04L 63/1441 |

FOREIGN PATENT DOCUMENTS

| CN | 105208037 A | 12/2015 |
| CN | 110213287 A | 9/2019 |

(Continued)

OTHER PUBLICATIONS

International Search Report dated Jul. 17, 2020 issued in PCT/CN2020/079972.

*Primary Examiner* — Brandon Hoffman
*Assistant Examiner* — Michael D Anderson
(74) *Attorney, Agent, or Firm* — Scully, Scott, Murphy & Presser, P.C.

(57) ABSTRACT

A method for detecting security based on machine learning in combination with rule matching is provided, including: establishing a machine learning model; training the machine learning model by using a labeled legal traffic and a labeled malicious traffic; collecting a network traffic; preprocessing the collected network traffic; detecting a malicious traffic from the preprocessed network traffic by using a rule-matching-based method; identifying a malicious traffic from the preprocessed network traffic by using the trained machine learning model, including: extracting a feature of the preprocessed network traffic, and identifying the malicious traffic based on the extracted feature by using the trained machine learning model; and integrating the mali-
(Continued)

cious traffic detected by the rule-matching-based method and the malicious traffic identified by the trained machine learning model.

16 Claims, 4 Drawing Sheets

(58) Field of Classification Search
USPC .......................................................... 726/23
See application file for complete search history.

(56) References Cited

FOREIGN PATENT DOCUMENTS

| | | |
|---|---|---|
| CN | 110224990 A | 9/2019 |
| CN | 110753064 A | 2/2020 |
| WO | 2016043739 A1 | 3/2016 |

* cited by examiner

METHOD AND DEVICE FOR DETECTING SECURITY BASED ON MACHINE LEARNING IN COMBINATION WITH RULE MATCHING

CROSS-REFERENCE TO RELATED APPLICATION

This application is a Section 371 National Stage Application of International Application No. PCT/CN2020/079972, filed on Mar. 18, 2020, entitled "METHOD AND DEVICE FOR DETECTING SECURITY BASED ON MACHINE LEARNING IN COMBINATION WITH RULE MATCHING", which claims priority to Chinese Application No. 201911031332.5, filed on Oct. 28, 2019, incorporated herein by reference in their entirety.

TECHNICAL FIELD

The present disclosure relates to a technical field of machine learning and information security, in particular, to a method and device for detecting security based on machine learning in combination with rule matching.

BACKGROUND

In nowadays society, computer networks are used in all walks of life. Computer networks may meet various requirements of businesses, enterprises and government agencies. However, these computer networks are more vulnerable than ever, because attackers have good organization, sufficient time, professional knowledge and a lot of resources to launch network attacks now. Like ordinary users, attackers generate data and hide malicious activities under terabytes of data. Due to storage of massive data, scalability problems and lack of security detection, many security mechanisms may not ensure the security of the network.

Intrusion detection system (IDS) was proposed in the 1980s, which determines whether a system performs normal action according to network traffic data. In nowadays secure communication and network infrastructure, IDS is a part of most networks. However, IDS detection mechanism is only useful when it has sufficient accuracy to distinguish normal traffic from malicious traffic. The results of using IDS include: malicious traffic is detected, malicious traffic is not detected, legal traffic is detected as malicious traffic by IDS, and legal traffic is detected by IDS.

Excellent IDS may detect as much malicious traffic as possible and reduce false positives. At present, there are many commercial IDSs, such as JuniperNetworks, McAfee, Cisco and Symantec. Commercial IDSs usually cannot provide an ideal performance as advertised and may damage the network security of computers. At the same time, many open source IDSs are available, such as Snort, Suricata and Bro.

A continuous increase of network speed and malicious traffic has brought serious problems to IDS. IDS should handle higher network traffic to detect malicious traffic, with a speed of about 10 Gbps. If IDS cannot perform packet checking at the required rate, undetected malicious packets may be allowed to enter the computer network.

Existing IDS uses a rule set to detect known malicious traffic. If the malicious traffic matches with the rule set, the IDS will trigger an alarm. This method has a high efficiency and low false positive rate.

SUMMARY

In one aspect, the present disclosure provides a method for detecting security based on machine learning in combination with rule matching, including:
  establishing a machine learning model
  training the machine learning model by using a labeled legal traffic and a labeled malicious traffic;
  collecting a network traffic;
  preprocessing the collected network traffic;
  detecting a malicious traffic from the preprocessed network traffic by using a rule-matching-based method;
  identifying a malicious traffic from the preprocessed network traffic by using the trained machine learning model, including: extracting a feature of the preprocessed network traffic, and identifying the malicious traffic based on the extracted feature by using the trained machine learning model; and
  integrating the malicious traffic detected by the rule-matching-based method and the malicious traffic identified by the trained machine learning model.

In another aspect, the present disclosure provides a device for detecting security based on machine learning in combination with rule matching, including:
  a processor; and
  a memory storing instructions, wherein the instructions, when executed by the processor, cause the processor to:
  establish a machine learning model;
  train the machine learning model by using a labeled legal traffic and a labeled malicious traffic;
  collect a network traffic;
  preprocess the collected network traffic;
  detect a malicious traffic from the preprocessed network traffic by using a rule-matching-based method;
  identify a malicious traffic from the preprocessed network traffic by using the trained machine learning model, including: extract a feature of the preprocessed network traffic, and identify the malicious traffic based on the extracted feature by using the trained machine learning model; and
  integrate the malicious traffic detected by the rule-matching-based method and the malicious traffic identified by the trained machine learning model.

BRIEF DESCRIPTION OF THE DRAWINGS

In order to explain the technical solution of the embodiments of the present disclosure, the accompanying drawings to be used in the description of the embodiments may be briefly introduced below. The drawings in the following description are only some embodiments of the present disclosure. For those skilled in the art, other embodiments may be obtained according to these embodiments without paying creative labor.

DETAILED DESCRIPTION OF EMBODIMENTS

The following is a complete description of the technical solution in the embodiments of the present disclosure in combination with the accompanying drawings in the embodiments of the present disclosure. The described embodiments are only part of the embodiments of the present disclosure, not all of the embodiments. Based on the embodiments of the present disclosure, all other embodiments obtained by those skilled in the art without making creative work fall within the protection scope of the present disclosure.

Figure 1:
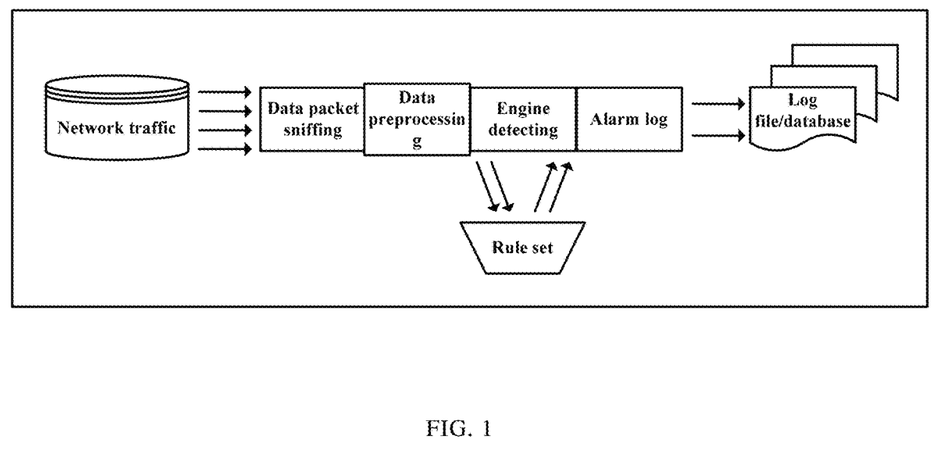
FIG. 1 is a schematic diagram of a single-thread architecture of Snort provided in the related art.

FIG. 1 is a schematic diagram of a single-thread architecture of Snort provided in the related art. Snort is an IDS supporting medium and high-speed networks with inline intrusion prevention function. Snort includes a module to obtain network packets, a module to decode and classify the network packets, and a module to detect malicious packets according to a rule set. Snort checks whether there is malicious traffic in network packets through the rule set, and triggers an alarm when a payload of the packet matches one of the rules.

Existing IDS may not take any action against unknown malicious traffic, and a false positive rate is high. This is because the existing IDS based on rule matching does not use machine learning technology, and may not prevent the unknown malicious traffic. With a rapid development of machine learning technology in recent years, machine learning technology may be used to detect the unknown malicious traffic, so as to reduce the false positive rate of IDS by actively dealing with the unknown malicious traffic. Now there are many machine learning algorithms that may be used in IDS, such as support vector machine, decision tree, fuzzy logic, naive Bayes and neural network.

Therefore, according to the embodiments of the present disclosure, a method and device for detecting security based on machine learning in combination with rule matching is provided. The method and device detect known and unknown malicious traffic by simultaneously using a rule-matching-based method and a machine learning method, so as to reduce the false positive rate and false negative rate of an intrusion detection system, improve an accuracy of malicious traffic detection, and ensure the security of the computer network. In addition, according to the embodiments of the present disclosure, GPU parallel computing technology may be used to enable the system to meet requirements of high throughput.

Figure 2:
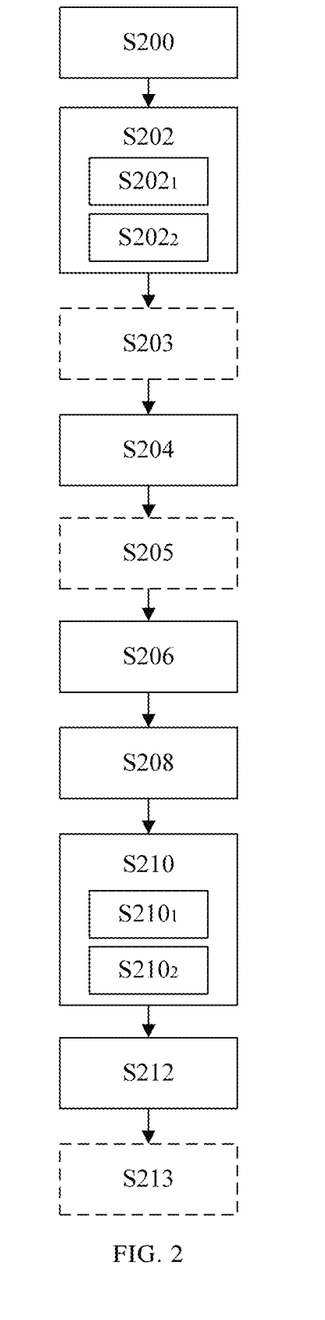
FIG. 2 is a flowchart of a method for detecting security based on machine learning in combination with rule matching according to the embodiments of the present disclosure.

FIG. 2 shows a method 20 for detecting security based on machine learning in combination with rule matching according to the embodiments of the present disclosure. As shown in FIG. 2, the method may include following steps. In step 200, a machine learning model is established. In step S202, the established machine learning model is trained by using a labeled legal traffic and a labeled malicious traffic. In step S204, a network traffic is collected. In step S206, the collected network traffic is preprocessed. In step S208, a malicious traffic is detected from the preprocessed network traffic by using a rule-matching-based method. In step S210, a feature of the preprocessed network traffic is extracted (S2101), and then the malicious traffic is identified (S2102) based on the extracted feature by using the trained machine learning model. In step S212, the malicious traffic detected by the rule-matching-based method and the malicious traffic identified by the trained machine learning model are integrated.

In some embodiments, the method 20 may optionally include following steps. In step S203, the trained machine learning model is verified by using a verification data set. In step S205, the collected network traffic is sampled according to a specified sampling rule. In step S213, an integrated result is visualized. If the method 20 includes the optional step S205, the step S206 of the method 20 further includes: preprocessing the sampled network traffic.

Figure 3:
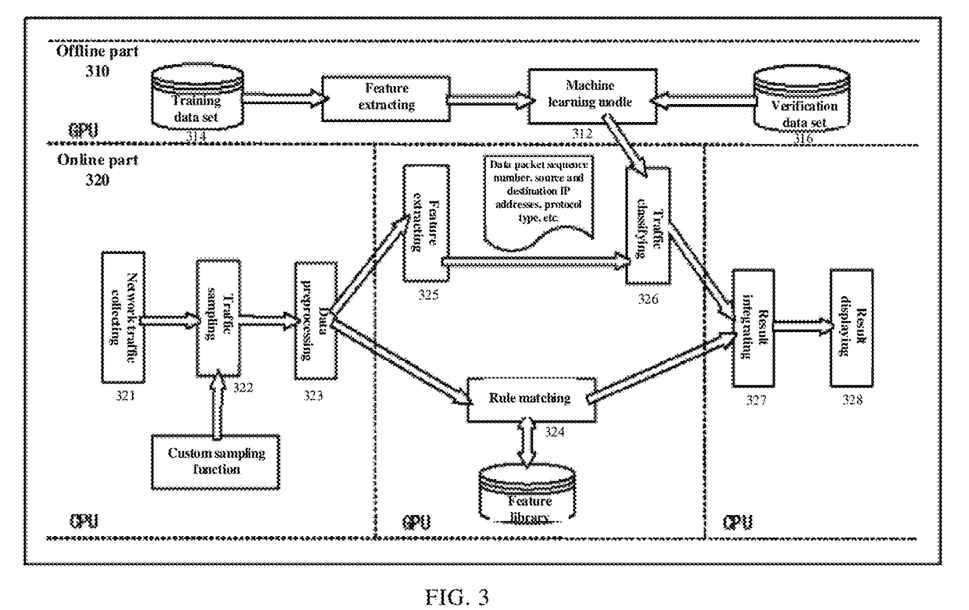
FIG. 3 is an architecture diagram of a system for detecting security based on machine learning in combination with rule matching according to the embodiments of the present disclosure.

FIG. 3 shows an exemplary system 30 for detecting security based on machine learning in combination with rule matching according to the embodiments of the present disclosure. The steps of the method 20 shown in FIG. 2 will be described in more detail below in connection with the system 30 for detecting security shown in FIG. 3.

The system 30 for detecting security shown in FIG. 3 mainly includes an offline part 310 and an online part 320. Steps S200, S202 and the optional step S203 of method 20 may be performed in the offline part 310 shown in FIG. 3. That is, in the offline part, a machine learning model 312 is established, the labeled legal traffic and the labeled malicious traffic are used as a training data set 314 to train the established machine learning model 312. Optionally, a verification data set 316 is used to verify the trained machine learning model.

Steps S204 to S212 and the optional steps S205 and S213 of method 20 may be performed in the online part 320 shown in FIG. 3. That is, in the online part, the network traffic is collected and preprocessed. Then, two parts of processing are carried out in parallel or sequentially. In a first part, the malicious traffic is detected from the preprocessed network traffic by using the rule-matching-based method. In a second part, the machine learning model is used to identify the malicious traffic in the preprocessed network traffic. The identification process may include extracting a feature from the preprocessed network traffic, and then, identifying the malicious traffic based on the extracted features by using the machine learning model trained in the offline part. Finally, results of the two processing parts are integrated to intercept the malicious traffic.

In the offline part 310 shown in FIG. 3, the machine learning model 312 is established first. The selectable machine learning models include support vector machine, decision tree, fuzzy logic, naive Bayes and neural network, etc. Then, the labeled legal traffic and the labeled malicious traffic are used as the training set 314. A time-based feature, a network-layer-based feature and a time-to-live-based (TTL-based) feature are extracted from the training set. Then, the established machine learning model 312 is trained based on these extracted features. The established machine learning model may be trained with reference to existing model training methods. After the training, the trained machine learning model may be verified using the verification data set 316. The verified model may be used for the processing of the online part.

In addition, the offline part may carry out a high-speed parallel operation on a GPU, so as to effectively improve a running speed of the system and meet the requirements of high throughput.

The online portion 320 of the exemplary system 30 may include following modules.

A network traffic collecting module 321 is used to collect a network traffic (step S204 shown in FIG. 2).

A traffic sampling module 322 is used to sample the collected network traffic according to a specified sampling rule (optional step S205 in FIG. 2). The traffic sampling module 322 may be optional.

A data preprocessing module 323 is used to preprocess the collected or sampled (if the collected network traffic is sampled) network traffic (step 206 in FIG. 2).

A rule matching module 324 is used to detect a malicious traffic from a preprocessed result by using a rule-matching-based method (step S208 in FIG. 2).

A feature extracting module 325 is used to extract a feature of the preprocessed result.

A traffic classifying module 326 is used to classify, based on the features extracted by the feature extracting module 330, the network traffic by using the machine learning model trained in the offline part (step S210 in FIG. 2), so as to identify the malicious traffic.

A result integrating module 327 is used to integrate the malicious traffic detected by the rule matching module 324 and the malicious traffic identified by the feature extracting module 325 and the traffic classifying module 326 (step S212 in FIG. 2).

A result displaying module 328 is used to display the integrated result by using a visualization technology (optional step S213 in FIG. 2).

In the above modules, the rule matching module 324, the feature extracting module 325 and the traffic classifying module 326 may run in parallel on the GPU, so as to improve the operation speed and meet the requirements of processing high-throughput network traffic.

A premise of network intrusion detection is to collect network traffic effectively. Online real-time intrusion detection systems often need to deal with input traffic up to 10-100 Gbps. Therefore, high-speed packet capture technology is a prerequisite for subsequent traffic identification. For the above reasons, the embodiments of the present disclosure adopt a high-performance data plane development kit (DPDK). A network traffic collecting module designed by DPDK may directly copy a data packet from a cache queue of a network card to a user space based on a zero copy technology by using a direct memory access (DMA) structure. In this way, a processing part of an intermediate kernel space is skipped, a lot of IO and processing time overhead of a kernel protocol stack is saved, and finally higher capture ability for line speed data packet is achieved.

However, the existing DPDK runs on the CPU in a serial mode, which makes it difficult to meet the requirements of capturing high-throughput data. In order to solve this problem, in the embodiments of the present disclosure, the existing data capturing tool is modified to make the network traffic collecting module run on the GPU, so as to improve the efficiency of collecting the network traffic.

Figure 4:
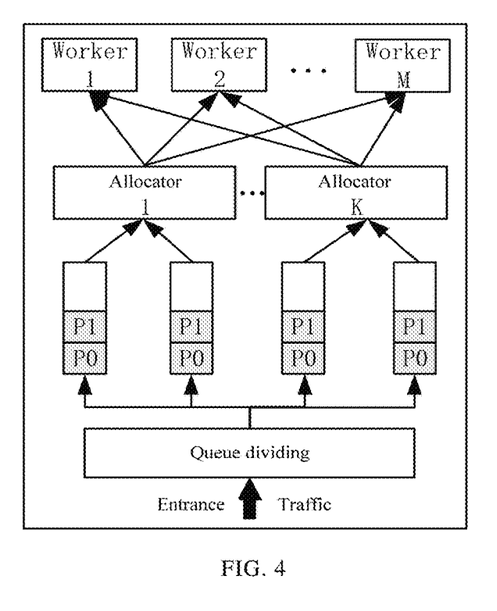
FIG. 4 is a schematic diagram of a software load distributor based on a multi-core CPU according to the embodiments of the present disclosure.

Currently, main network card supports dividing its ring buffer into a plurality of hardware queues (typically, a single network card supports up to 16 queues). This feature may be used in a scenario of multi-core CPU for data packet processing. By using a scheduling method based on hash function, massive input data packets may be distributed to a plurality of network card queues for load balancing, which implements a load balancing of data stream granularity. According to the embodiments of the present disclosure, a hash-function-based method is mainly used to map the input data stream to a dedicated queue. Here, a quadruple (source IP address, source port number, destination IP address and destination port number) of a data packet in the data stream is mainly used as an input to obtain a hash value. It should be noted that for an interactive session, forward and backward data streams are treated as a separate stream because hash values obtained for them are the same. In the scenario of multi-core CPU, there are two main ways to capture a data packet, including: a single queue to single core mapping and a load balancing based on software allocator. The present disclosure adopts the method of load balancing based on software distributor. FIG. 4 shows a schematic diagram of a multi-core CPU based software load distributor 40 according to the embodiments of the present disclosure. In the load distributor 40, there are K CPUs as load distributors and remaining M CPUs as workers. The load distributors are specially used to retrieve packets from the network card queue, and then allocate the packets to idle workers, the workers are mainly responsible for the subsequent packet preprocessing process.

Since data traffic through different systems is different, and different systems have different requirements for system security, the system 30 for detecting security is provided with a traffic sampling module. Sampling refers to a process of extracting some representative data from a large amount of data according to a certain sampling law. Different sampling functions are set according to different requirements to reduce a consumption of memory and CPU of measurement equipment in high-speed network.

Two sampling techniques are widely used, including: a packet sampling and a stream sampling. The packet sampling tends to be implemented with little CPU ability and memory. However, the packet sampling may not accurately infer a statistical characteristic of a stream. Adaptive packet sampling technology may adjust a sampling rate to reduce memory consumption or increase the accuracy of statistics. The stream sampling overcomes the limitations of the packet sampling, which may improve the accuracy, but the stream sampling needs to consume more memory and CPU. In order to solve these problems, especially to reduce memory and bandwidth consumption, a flexible sampling algorithm is adopted in the present disclosure.

The flexible sampling algorithm is a data stream record selection algorithm depending on a size of the data stream in the network traffic. For a data stream set $S=\{X_1, \ldots, X_n\}$ with a size n, a data stream $x_i'$ with a size $x_i$ is selected from each $X_i$ through the flexible sampling algorithm with a probability $P(x_i)$, $i=1, \ldots, n$, so as to form a new data stream set $S'=\{x_1', \ldots, x_n'\}$; the flexible sampling algorithm aims to make a total number of byte $X'=\Sigma_{x_i' \in S} x_i'/P(x_i)$ calculated by sampling approach a total number of byte $X=\Sigma_{X_i \in S} X_i$ of a real traffic; where $i=1, \ldots, n$.

Data preprocessing is to process data before a detection. A corresponding plug-in is used to check an original data packet in the data stream, so as to find a "behavior" of the original data, such as port scanning, IP fragmentation, etc. The data packet in the data stream may be transmitted to the existing rule matching module and the feature extraction and traffic classifying module after preprocessing.

The data preprocessing mainly includes a packet reassembling, a protocol decoding and an anomaly detection.

The package reassembling mainly includes a fragment reassembling and a stream reassembling. The fragment reassembling means that a data link layer uses MTU (maximum transmission unit) to limit a size of data packet that may be transmitted. When a size of a sent IP datagram exceeds the MTU, an IP layer needs to fragment the data. The stream reassembling means that TCP divides the data stream into message segments of appropriate length, in which a maximum message segment size (MSS) is usually limited by Ethernet MTU. TCP uses IP to transmit its message segments, and IP does not provide the functions of de-duplication and ensuring a correct order, so the stream reassembling is mainly used to deal with packet out-of-order and packet duplication.

Protocol decoding is a process of decoding the protocol of the data packet into a unified format to facilitate the rule matching of the existing rule matching module. For example, in HTTP messages, URLs have many expression formats, such as ASCII and Unicode. Different expression formats bring great inconvenience to malicious traffic monitoring. Attack messages may often be detected in one format. Through protocol decoding, messages in various formats are converted into detectable standard formats in advance for subsequent detection.

Anomaly detection includes port scanning, etc. Port access may be legal or illegal, but there is no fixed rule to determine whether a port access is legal. If detected by rule matching, the false positive rate and the false negative rate may be high. Therefore, the data preprocessing module uses a state detection method to statistically analyze the port access, destination host and other conditions within a certain period of time, and sends an alarm for a port access beyond a normal condition.

In normal condition, when a packet passes the anomaly detection, an output of the preprocessing is the data after packet reassembling and protocol decoding. However, for some illegal traffic, such as Dos attack traffic, using rule matching to detect Dos may lead to high false positive rate and false negative rate. Therefore, the present disclosure introduces the means of anomaly detection in the preprocessing stage to clean up the illegal traffic in advance, and an alarm may be generated if there is illegal access to the port.

An existing rule matching module uses an existing rule set and matching algorithm of an intrusion detection system to detect the malicious traffic, such as Snort and hyperscan. The existing rule matching algorithm includes Aho-Corasick algorithm and a regular-expression-based matching algorithm. When a payload of the network traffic matches with the rule set of the intrusion detection, the existing rule matching algorithm may mark the traffic as the malicious traffic and trigger an alarm, so as to find the malicious traffic that has been set in the rule set. However, the existing rule matching algorithm runs on CPU, which makes it unable to meet the high-throughput and real-time requirements of intrusion detection system. In this regard, the present disclosure improves the existing rule matching algorithm to make it operate in parallel on the GPU, so as to effectively improve the efficiency of the system for detecting security.

In the embodiments of the present disclosure, Parallel Failureless Aho-Corasick (PFAC) algorithm is used to detect the malicious traffic. PFAC algorithm effectively makes use of parallelism of AC algorithm. A separate thread is created for each byte of an input data stream through the PFAC algorithm, so as to identify a mode starting from a starting position of the thread. The number of created thread equals to a length of the input data stream. Each thread of the PFAC algorithm is only responsible for identifying the mode starting from the starting position of the thread, and terminating in response to the thread failing to find any mode located at the starting position of the thread, without a fault transition by a backtracking state machine. Each final state of the PFAC algorithm represents a specified mode, so that a uniqueness of the each final state in the PFAC is maintained without processing a plurality of outputs. Although PFAC creates a large number of threads, most threads are likely to terminate early. This is because the threads of PFAC are only responsible for matching patterns from the starting positions of the threads.

Therefore, the improved PFAC algorithm is used to match and verify a payload of the network traffic with a plurality of rules in the rule set of an intrusion detection at the same time and in parallel. If a match exists, the traffic is marked as the malicious traffic and an alarm is triggered to find the malicious traffic that has been set in the rule set. This algorithm is effectively suitable for GPU parallel computing and improves the detection efficiency of the existing rule matching module.

The features of network data traffic are diverse. The feature extracting module 325 first extracts relevant features to be counted, and the features includes: a source port, a source address, a destination port, a destination address, an ICMP type, a protocol identifier, an original data length and an original data. Then, the traffic classifying module 326 classifies the network traffic into legal traffic or malicious traffic based on the extracted features by using the machine learning model trained in the offline part, so as to effectively identify the unknown malicious traffic that cannot be detected by the rule matching method.

Due to a continuous arrival of data packets, the feature data information corresponding to a specified data stream should be updated in real time when a data packet arrives. Considering that the massive traffic of up to 100 Gbps may contain tens of thousands of active data streams and millions of packets per second, it will be very challenging to quickly retrieve the target feature data under such a large number of update requests.

In order to solve this problem, in the embodiments of the present disclosure, in the feature extraction stage, a hash table is implemented in the GPU to maintain and track an index of a feature data corresponding to each active data stream. A specified hash value for each data unit is used to determine a specified data stream. An atomic lock is used on each mutually exclusive hash entry, so that only one thread is allowed to update a hash entry of the thread at each moment. A data stream corresponding to a feature data becomes inactive in response to the feature data being transmitted, so as to trigger an operation of deleting the feature data corresponding to the data stream from the hash table. For each data stream, a moment of a last-arrived packet is recorded in the hash table. A threshold-based method is used to determine an inactive data stream. Specifically, if a time interval exceeds a certain threshold, the feature data of the corresponding data stream is determined as inactive. A feature data of the inactive data stream is output by providing a timing task for in-depth analysis (i.e., classifying by using the machine learning model trained in the offline part), or the feature data of the inactive data stream is directly output to an output file (i.e., saving the stream statistical information extracted by the feature extracting module and traffic analysis module) for offline analysis.

The result integrating module may integrate the malicious traffic detected by the rule matching module 324 and the malicious traffic identified by the feature extracting module 325 and the traffic classifying module 326, so that the malicious traffic may be intercepted and the legal traffic may pass smoothly. The result displaying module may save features of the intercepted malicious traffic to a database and display the integrated result through visualization technology, so as to display whether the system has been attacked by malicious attacks in real time, take corresponding actions, and make subsequent feature analysis of the malicious traffic.

The above technical scheme provided according to the embodiments of the present disclosure mainly includes following beneficial effects.

1) The known malicious traffic is identified. The known malicious traffic is detected by using the rule set of existing intrusion detection system for rule matching. If the malicious traffic matches with the rule set, the alert is triggered. This method has a high efficiency and low false positive rate.

2) The unknown malicious traffic is identified. The offline trained machine learning model is used to detect the traffic through the extracted network traffic feature, so as to find the unknown malicious traffic. This method has a low false negative rate.

3) The false positive rate and false negative rate are reduced. By combining the rule-matching-based method with the machine learning method, may not only the known malicious traffic may be detected through the rule set, but also the unknown malicious traffic may be detected through the machine learning technology, so as to reduce the false positive rate and false negative rate.

4) Online detection is performed. In the method and system of the present disclosure, the relevant machine learning model is trained offline, and then the security detection is performed online in combination with the existing rule matching intrusion detection method, so as to meet the real-time requirements of the system.

5) The requirement of high throughput is met. This method uses CPU and GPU in hardware, which gives full play to their respective advantages. The machine learning model is trained in the offline mode. Data packet capturing, feature extraction and classification, and parallel calculation of the rule matching module on the GPU are performed in the online mode. This may improve a global efficiency of the system in detecting malicious traffic.

The system for detecting security according to the above embodiments is described below in combination with a specific example.

Figure 5:
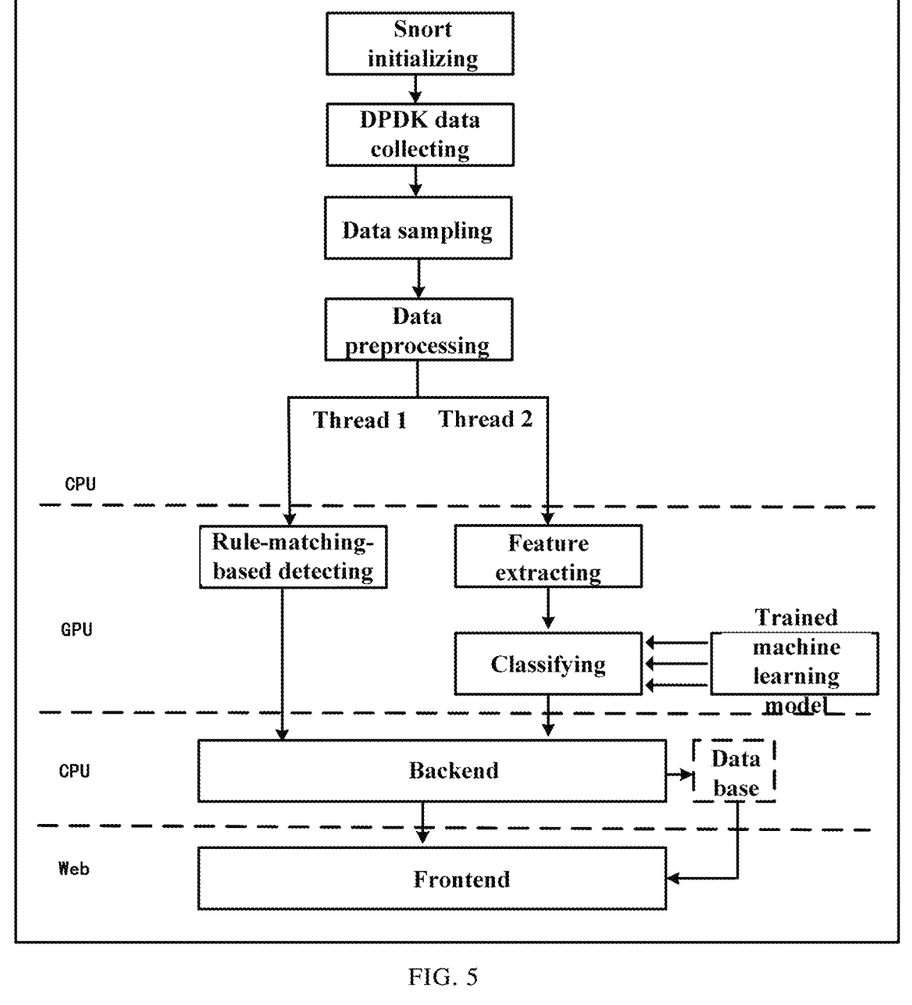
FIG. 5 is a framework diagram of a system for detecting security according to the embodiments of the present disclosure.

As shown in FIG. 5, the system for detecting security takes Snort open source intrusion detection system as a main framework. First, Snort is initialized. Then the network traffic capture tool DPDK is used to collect the network traffic. In order to meet the requirements of high throughput and real-time, DPDK is transplanted to GPU to capture packets in parallel, so as to effectively improve the efficiency of network traffic collection. Then, a sampling function is provided for the system 30 for detecting security. Since the design of the system needs to meet the requirements of real-time and high throughput, in this example, the sampling function is set to capture one packet every two packets. Then, the sampled data are preprocessed by packet reassembling, protocol decoding and port detection. Next, two threads are provided, one of which uses the rule set of Snort and matching algorithm for rule matching to identify malicious traffic, and transplants the rule matching algorithm of Snort to GPU for parallel computing, so as to improve the efficiency of rule matching. Another thread performs feature extraction on the source port, source address, destination port, destination address, ICMP type, protocol identifier, original data length and original data of the data packet. Then the trained machine learning model is used to classify the traffic, so as to identify the unknown malicious traffic. Finally, the results obtained by the two threads are integrated to effectively intercept the malicious traffic and make the legal traffic pass through the detection system smoothly.

Alternatively, the integrated result may be displayed on the visualization interface, and/or the relevant information of malicious traffic may be stored in the database for subsequent analysis and processing.

Figure 6:
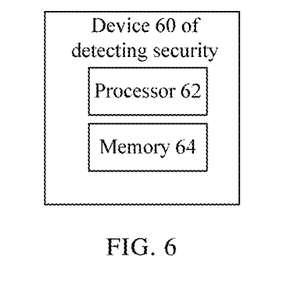
FIG. 6 is a block diagram of a device for detecting security based on machine learning in combination with rule matching according to the embodiments of the present disclosure.

FIG. 6 shows a block diagram of a device 60 for detecting security based on machine learning in combination with rule matching according to the embodiments of the present disclosure. As shown in FIG. 6, the device 60 for detecting security may include a processor 62 and a memory 64. The memory 64 stores instructions that may be executed by the processor 62. When the instructions are executed by the processor 62, the processor 62 establishes a machine learning model; trains the established machine learning model by using a labeled legal traffic and a labeled malicious traffic; collects a network traffic; preprocesses the collected network traffic; detects a malicious traffic from the preprocessed network traffic by using a rule-matching-based method; extracts a feature of the preprocessed network traffic, and identifies the malicious traffic based on the extracted feature by using the trained machine learning model; and integrates the malicious traffic detected by the rule-matching-based method and the malicious traffic identified by the trained machine learning model.

According to the embodiments of the present disclosure, when the instructions are executed by the processor 62, the processor 62 is further caused to perform any step of the method shown in FIG. 2.

Through the description of the above embodiments, those skilled in the art may understand that the above embodiments may be implemented by software or by means of software with necessary general hardware platform. Based on this understanding, the technical solution of the above embodiments may be embodied in the form of software product. The software product may be stored in a nonvolatile storage medium (which may be CD-ROM, USB flash disk, mobile hard disk, etc.), which includes several instructions to enable a computer device (which may be a personal computer, server, network device, etc.) to perform the methods described in various embodiments of the present disclosure.

Those skilled in the art may understand that for the convenience and simplicity of description, only the division of the above functional modules is illustrated. In practical application, the above functions may be allocated by different functional modules as needed, that is, the internal structure of the system may be divided into different functional modules to complete all or part of the functions described above.

The above is only the optional specific embodiments of the present disclosure, but the scope of protection of the present disclosure is not limited to this. Any change or replacement that tends to be thought of by those skilled in the art within the technical scope of the disclosure shall be covered by the protection scope of the disclosure. Therefore, the protection scope of the present disclosure should be subject to the protection scope of the claims.

What is claimed is:

1. A method for detecting security based on machine learning in combination with rule matching, comprising:
establishing a machine learning model;
training the machine learning model by using a labeled legal traffic and a labeled malicious traffic;
collecting a network traffic;
preprocessing the collected network traffic;
detecting a malicious traffic from the preprocessed network traffic by using a rule-matching-based method;

identifying a malicious traffic from the preprocessed network traffic by using the trained machine learning model, comprising: extracting a feature of the preprocessed network traffic, and identifying the malicious traffic based on the extracted feature by using the trained machine learning model; and integrating the malicious traffic detected by the rule-matching-based method and the malicious traffic identified by the trained machine learning model, wherein the method further comprises:
sampling the collected network traffic according to a specified sampling rule, and the preprocessing the collected network traffic further comprises: preprocessing the sampled network traffic; and wherein the method further comprises: displaying an integrated result through a visualization technology, wherein the sampling the collected network traffic comprises:
sampling the collected network traffic by using a flexible sampling algorithm;

wherein the flexible sampling algorithm is a data stream record selection algorithm depending on a size of the data stream; for a data stream set $S=\{X_1, \ldots, X_n\}$ with a size n, a data stream $x_i'$ with a size $x_i$ is selected from each $X_i$ through the flexible sampling algorithm with a probability $P(x_i)$, i=1, ..., n, so as to form a new data stream set $S'=\{x_1', \ldots, x_n'\}$; the flexible sampling algorithm aims to make a total number of byte $X'=\Sigma_{x_i' \in S'} x_i'/P(x_i)$ calculated by sampling approach a total number of byte $X=\Sigma_{x_i \in S} X_i$ of a real traffic; where i=1, ..., n.

2. The method according to claim 1, wherein the training the machine learning model by using a labeled legal traffic and a labeled malicious traffic comprises:
extracting a time-based feature, a network-layer-based feature and a TTL-based feature from the labeled legal traffic and the labeled malicious traffic; and
training the machine learning model based on the extracted features; and
wherein the method further comprises: verifying the trained machine learning model by using a verification data set.

3. The method according to claim 1, wherein the network traffic is collected by a GPU, and a data packet in the network traffic is directly copied from a cache queue of a network card to a user space based on a zero copy technology by using a direct memory access structure.

4. The method according to claim 1, wherein the preprocessing the collected network traffic further comprises: performing a data packet reassembling, a protocol decoding and/or an anomaly detection on a data packet in the collected network traffic; wherein the data packet reassembling comprises a stream reassembling and a fragment reassembling, the protocol decoding is to decode a protocol of the data packet into a unified format, and the anomaly detection at least comprises a port scanning; and wherein a result of the preprocessing is a data after the packet reassembling and the protocol decoding in response to the data packet passing the anomaly detection; and an alarm is generated in response to the data packet failing the anomaly detection.

5. The method according to claim 1, wherein the detecting a malicious traffic from the preprocessed network traffic by using a rule-matching-based method comprises:
detecting the malicious traffic by using a PFAC algorithm;
wherein a separate thread is created for each byte of an input data stream through the PFAC algorithm, so as to identify a mode starting from a starting position of the thread, and the number of created thread equals to a length of the input data stream;

wherein each thread of the PFAC algorithm is only responsible for identifying the mode starting from the starting position of the thread, and terminating in response to the thread failing to find any mode located at the starting position of the thread, without a fault transition by a backtracking state machine; each final state of the PFAC algorithm represents a specified mode, so that a uniqueness of the each final state in the PFAC is maintained without processing a plurality of outputs;

wherein a payload of the data stream is matched and verified with a plurality of rules in a rule set of an intrusion detection at the same time and in parallel through the PFAC algorithm, and in response to a match existing, the data stream is marked as the malicious traffic and an alarm is triggered.

6. The method according to claim 1, wherein the extracting a feature of the preprocessed network traffic comprises: extracting a source port, a source address, a destination port, a destination address, an ICMP type, a protocol identifier, an original data length and an original data.

7. The method according to claim 6, wherein the extracting a feature of the preprocessed network traffic comprises:
implementing a hash table in a GPU, wherein the hash table is used to maintain and track an index of a feature data of each active traffic in the network traffic, and a specified hash value for each data unit is used to determine a specified data stream;

wherein an atomic lock is used on each mutually exclusive hash entry, so that only one thread is allowed to update a hash entry of the thread at each moment; a data stream corresponding to a feature data becomes inactive in response to the feature data being transmitted, so as to trigger an operation of deleting the feature data corresponding to the data stream from the hash table; and for each data stream in the network traffic, a moment of a last-arrived packet is recorded in the hash table, wherein a threshold-based method is used to determine an inactive data stream, the threshold-based method comprises: determining that the feature data corresponding to the data stream is inactive in response to a time interval exceeding a threshold;

wherein a feature data of the inactive data stream is output by providing a timing task, and the trained machine learning model is used for classifying based on the feature data.

8. The method according to claim 1, wherein the steps of establishing and training the machine learning model are performed offline, and the steps of the collecting, preprocessing, detecting, identifying and integrating are performed online.

9. A device for detecting security based on machine learning in combination with rule matching, comprising:
a processor; and
a memory storing instructions, wherein the instructions, when executed by the processor, cause the processor to:
establish a machine learning model;
train the machine learning model by using a labeled legal traffic and a labeled malicious traffic;
collect a network traffic;
preprocess the collected network traffic;
detect a malicious traffic from the preprocessed network traffic by using a rule-matching-based method;

identify a malicious traffic from the preprocessed network traffic by using the trained machine learning model, comprising: extract a feature of the preprocessed network traffic, and identify the malicious traffic based on the extracted feature by using the trained machine learning model; and integrate the malicious traffic detected by the rule-matching-based method and the malicious traffic identified by the trained machine learning model, wherein the instructions, when executed by the processor, further cause the processor to:

sample the collected network traffic according to a specified sampling rule, and preprocess the sampled network traffic; and wherein the instructions, when executed by the processor, further cause the processor to: display an integrated result through a visualization technology, wherein the instructions, when executed by the processor, further cause the processor to:

sample the collected network traffic by using a flexible sampling algorithm;

wherein the flexible sampling algorithm is a data stream record selection algorithm depending on a size of the data stream; for a data stream set S= $\{X_1, \ldots, X_n\}$ with a size n, a data stream $x_i'$ with a size $x_i$ is selected from each $X_i$ through the flexible sampling algorithm with a probability P $(x_i)$, i=1, . . . , n, so as to form a new data stream set S'=$\{x_1', \ldots, x_n'\}$; the flexible sampling algorithm aims to make a total number of byte X'=$\Sigma_{x_i' \in s''} x_i'/P(x_i)$ calculated by sampling approach a total number of byte X=$\Sigma_{x_i \in s} X_i$ of a real traffic; where i=1, . . . , n.

10. The device according to claim 9, wherein the instructions, when executed by the processor, further cause the processor to:

extract a time-based feature, a network-layer-based feature and a TTL-based feature from the labeled legal traffic and the labeled malicious traffic;

train the machine learning model based on the extracted features; and verify the trained machine learning model by using a verification data set.

11. The device according to claim 9, wherein the network traffic is collected by a GPU, and a data packet in the network traffic is directly copied from a cache queue of a network card to a user space based on a zero copy technology by using a direct memory access structure.

12. The device according to claim 9, wherein the instructions, when executed by the processor, further cause the processor to:

perform a data packet reassembling, a protocol decoding and/or an anomaly detection on a data packet in the collected network traffic;

wherein the data packet reassembling comprises a stream reassembling and a fragment reassembling, the protocol decoding is to decode a protocol of the data packet into a unified format, and the anomaly detection at least comprises a port scanning; and wherein a result of the preprocessing is a data after the packet reassembling and the protocol decoding in response to the data packet passing the anomaly detection; and an alarm is generated in response to the data packet failing the anomaly detection.

13. The device according to claim 9, wherein the instructions, when executed by the processor, further cause the processor to:

detect the malicious traffic by using a PFAC algorithm;

wherein a separate thread is created for each byte of an input data stream through the PFAC algorithm, so as to identify a mode starting from a starting position of the thread, and the number of created thread equals to a length of the input data stream;

wherein each thread of the PFAC algorithm is only responsible for identifying the mode starting from the starting position of the thread, and terminating in response to the thread failing to find any mode located at the starting position of the thread, without a fault transition by a backtracking state machine; each final state of the PFAC algorithm represents a specified mode, so that a uniqueness of the each final state in the PFAC is maintained without processing a plurality of outputs;

wherein a payload of the data stream is matched and verified with a plurality of rules in a rule set of an intrusion detection at the same time and in parallel through the PFAC algorithm, and in response to a match existing, the data stream is marked as the malicious traffic and an alarm is triggered.

14. The device according to claim 9, wherein the instructions, when executed by the processor, further cause the processor to:

extract a feature of the preprocessed network traffic comprises: extract a source port, a source address, a destination port, a destination address, an ICMP type, a protocol identifier, an original data length and an original data, wherein the instructions, when executed by the processor, further cause the processor to:

implement a hash table in a GPU, wherein the hash table is used to maintain and track an index of a feature data of each active traffic in the network traffic, and a specified hash value for each data unit is used to determine a specified data stream;

wherein an atomic lock is used on each mutually exclusive hash entry, so that only one thread is allowed to update a hash entry of the thread at each moment; a data stream corresponding to a feature data becomes inactive in response to the feature data being transmitted, so as to trigger an operation of deleting the feature data corresponding to the data stream from the hash table; and for each data stream in the network traffic, a moment of a last-arrived packet is recorded in the hash table, wherein a threshold-based method is used to determine an inactive data stream, the threshold-based method comprises: determining that the feature data corresponding to the data stream is inactive in response to a time interval exceeding a threshold;

wherein a feature data of the inactive data stream is output by providing a timing task, and the trained machine learning model is used for classifying based on the feature data.

15. The device according to claim 9, wherein the instructions, when executed by the processor, further cause the processor to:

perform the operations of establishing and training the machine learning model in an offline manner, and perform the operations of the collecting, preprocessing, detecting, identifying and integrating in an online manner.

16. A computer-readable storage medium storing instructions that, when executed by a processor, cause the processor to implement the method according to claim 1.

* * * * *